April 23, 1957  H. T. COSS  2,789,322
REFRIGERATOR FLOOR INSULATION
Filed Jan. 28, 1949
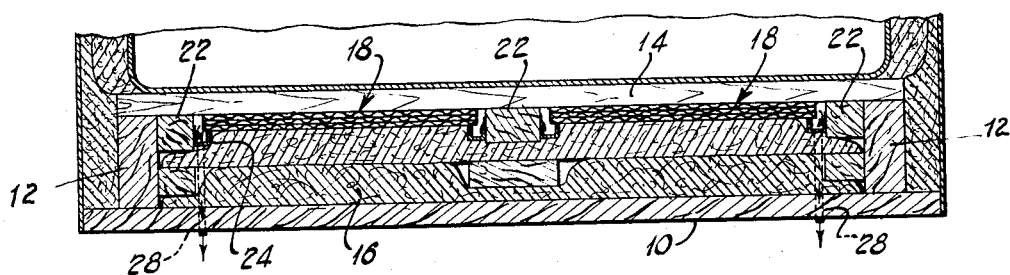
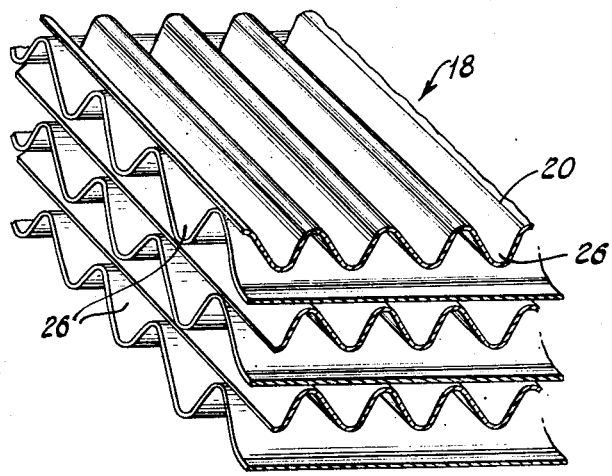
INVENTOR
HAROLD T. COSS.
BY
ATTORNEY

United States Patent Office 2,789,322
Patented Apr. 23, 1957

2,789,322

REFRIGERATOR FLOOR INSULATION

Harold T. Coss, Plainfield, N. J., assignor to Johns-Manville Corporation, New York, N. Y., a corporation of New York Application January 28, 1949, Serial No. 73,330

8 Claims. (Cl. 20—6)

The present invention relates to refrigerator floor insulation, and is particularly concerned with an improved method of heat insulating the floors of railroad refrigerator cars.

The standard insulation for insulating the inner linings, including the floors, of railroad refrigerator cars, consists of hair felt or other fibrous insulation blankets. Difficulty has been experienced, however, with present fibrous blankets or cellular materials suitable for refrigerator car floor insulation, because such insulating mateials absorb moisture. It has been proposed to protect such insulation from below by vapor barriers, or to waterproof the refrigerator floor as a moisture barrier above the insulation. Despite these precautions moisture in moist air finds its way into the insulation and condenses on the cold external face of the refrigerator floor, such condensed moisture being absorbed from the underside of the floor or moisture barrier into the blanket insulation. The heat insulating efficiency of the external insulation is thereby adversely affected in proportion to the degree of dampness developed during the full period of maintenance of refrigeration on the upper side of the floor.

One reason that this condition has not generally developed a permanent impairment of the insulating efficiency is that the blanket insulation usually dries out during empty return trips of the refrigerator car. Nevertheless, the results of condensed moisture absorption by the insulating blanket are sometimes serious, since much lading is spoiled through inadequate refrigerator insulation.

An object of the present invention is to provide a method or means for protecting the insulation of refrigerator car floors against the effects of moisture which works its way in the form of water vapor into and through the insulation from the ambient air, and which is condensed at or adjacent the cold underside of the waterproof floor of the car and drips down into the insulation blanket as sensible moisture.

A more particular object is to provide a means of permanently protecting the insulation of a refrigerator car floor against reduction of insulation efficiency caused by absorption of sensible moisture.

An incidental advantage of the present invention is that the underside of the refrigerator car beneath the inner floor lining is protected against corrosion or rotting by condensed moisture.

With the above objects in view the invention consists in the improved heat insulating construction for refrigerator floors, including refrigerator car floors, which is hereinafter described and more particularly defined by the accompanying claims.

In the following description reference will be made to the attached drawings, in which:

Fig. 1 presents a transverse vertical sectional view of an externally insulated refrigerator car floor lining in accordance with the present invention; and Fig. 2 is an enlarged perspective view of a segment of moisture vapor permeable sensible moisture impermeable plied corrugated plastic foil insulation such as interposed between the bottom of the refrigerator floor and the conventional blanket insulation in accordance with the present invention.

Referring to Fig. 1 of the drawings, the elements of a conventional railroad refrigerator car floor assembly normally includes a subfloor 10 of the car, side sills 12, and a waterproof floor 14 supported in spaced relation above floor 10 and comprising the lining floor of the refrigerator chamber. The conventional insulation for this floor comprises one or more blankets of hair felt or equivalent highly efficient fibrous insulation units, such as the hair felt blankets 16 which are portrayed in Fig. 1.

According to the present invention the layer or layers 16 of conventional hair felt or equivalent moisture absorbable insulation are permanently protected against loss of efficiency through absorption of condensed moisture, by interposing between the outer bottom surface of the refrigerator floor 14 and the top insulation blanket 16, a suitably thick layer 18 of vapor permeable moisture impermeable apertured plastic foil laminate thermal insulation which will serve to trap condensed sensible moisture and permit drainage removal thereof from the insulation housing.

As an example of a suitable type of vapor permeable moisture impermeable thermal insulation for use as the element 18 of the assembly portrayed in Fig. 1, it has been found that a multi-ply laminate of corrugated cellulose acetate foil will provide adequate permanent protection against the harmful effects of moisture to underlying hair felt insulation blankets 16, in an assembly such as illustrated. A preferred corrugated plastic foil insulation, as portrayed in Fig. 2, comprises multiple plies of corrugated plastic foils 20, with the corrugations of alternate plies crossing one another. It is not essential that the corrugations of alternate plies be placed at right angles, and alternate foils may comprise flat sheets between corrugated sheets; nor is the invention limited to the use of any particular number of corrugated foils in an assembled unit. The individual foils 20 preferably have a thickness of approximately .0015 inch, although they may range in thickness between about .0004 inch and .002 inch. The adjacent foils are preferably spaced a distance of 0.1–0.3 inch, and such spacing is normally fixed in crossed-corrugated foil assemblies, by the depth of the corrugations.

It will be understood that the invention is not limited to the use of plied corrugated cellulose acetate foil, since foils of other cellulose esters and of other thermoplastic flexible resins such as polyvinyl plastic foils and polyolefin foils, have adequate water vapor permeability and sensible moisture impermeability for the stated purpose.

In the assembly as portrayed in Fig. 1, the depth of the chamber in which the insulation is housed between subfloor 10 and floor 14 usually comprises about three to four inches. Nailing stringers 22 are provided for holding the insulating elements 16 and 18 in suitably stationary position. Small metal drainage troughs 24 are attached or built into the sides of the top nailing stringers 22, with adequate flashing, in position to accept and drain off water which is trapped by the insulating layer 18. It will be recognized that the corrugation troughs 26 of such corrugated foil insulation serve to collect trapped moisture and to drain off such moisture to troughs 24 encircling the periphery of each unit or batt of the layer insulation 18. The gutters or troughs 24 in turn lead to down spouts 28 which are located strategically to drain off water through the outer floor 10. A one inch thick layer 18 of vapor permeable water impermeable plied corrugated plastic foil insulation is normally adequate to accept in the form of vapor all moisture entering the insulation zone and to trap such moisture after it condenses at or adjacent the cold outer surface of the floor 14, to drain off such moisture into the side and end gutters 24, and to thus permanently prevent moisture absorption by the standard fibrous insulation blanket 16.

It will be understood that the multi-ply spaced foil insulation layer 18 does not have as high thermal insulation efficiency as the conventional hair felt type of insulation 16. However, the corrugated foil insulation does have the advantage that its efficiency is relatively unaffected by the presence of water or small amounts of ice. Corrugated foil insulation such as described, in thicknesses of about one inch, serves adequately to trap moisture migrating through the pores thereof to the cold outer surface of the floor 14, and to prevent condensed or sensible moisture from reentering the underlying hair felt blankets. It has been found unnecessary that the corrugated foil 18 have sufficient thickness to extend to the dew point isotherm.

In the event that cellulose acetate foils are used for making up the protective insulating layer 18, it is advantageous to incorporate with the cellulose acetate a certain proportion, for example about 15 to 20%, of a plasticizing agent of the type of tricresyl phosphate. It is also desirable to impart opacity to such foils by incorporating therein finely divided opacifying materials such as mineral pigments, graphite, and the like. Included among such opacifying pigments may be fire retardant materials of the type of boric acid, sodium borate, aluminum phosphate, and the like.

It has been experimentally determined that, by using a layer 18 of about one inch thickness, the moisture will pass through the lowest sheet of the vapor permeable foil toward a colder area, rather than condensing on the lowest foil and dropping back into more thermally efficient insulation underlying such foil. Cellulose acetate and similar ester or other suitable plastic foils are water impermeable, but are not vapor barriers in suitably thick layers thereof. In the event that the present composite insulation is applied to refrigeration units which are operated at low temperatures for the preservation of frozen foods, the vibration of the refrigeration car in transit will normally be sufficient to insure drainage off of moisture before it freezes within the corrugation troughs 26. However, even if the corrugated foils 18 tend to fill up with frost at some period during the refrigeration cycle before unloading the car lading, the refrigeration cycle will normally be short enough so that condensation will not occur in the layers of fibrous insulation 16 underlying the corrugated foil insulation 18, because of the thickness of corrugated foil insulation provided. Any frost accumulating in the corrugated foil layer 18 will be thawed and drained off during the return empty trip of the refrigeration car.

The invention which has been thus described by detailed example is not limited as to such details and it is to be understood that variations, changes and modifications are contemplated within the scope of the invention as defined by the following claims.

What I claim is:

1. An insulated refrigerator floor comprising, a moisture absorptive heat insulating blanket underlying said floor, and means protecting said blanket from sensible moisture condensed adjacent the under surface of the floor comprising a water vapor permeable sensible moisture impermeable heat insulating unit having sensible moisture trapping means interposed between the floor and the blanket.

2. An insulated refrigerator floor comprising, a moisture absorptive heat insulating blanket underlying said floor, and means protecting said blanket from sensible moisture condensed adjacent the under surface of the floor comprising a water vapor permeable sensible moisture impermeable heat insulating layer of multiple plies of corrugated plastic foil interposed between the floor and the blanket.

3. An insulated refrigerator floor comprising, a moisture absorptive heat insulating blanket underlying said floor, and means protecting said blanekt from sensible moisture condensed adjacent the under surface of the floor comprising a water vapor permeable sensible moisture impermeable heat insulating unit consisting of multiple plies of corrugated plastic foil interposed between the floor and the blanket, the corrugation troughs of the foils comprising water drainage elements.

4. An insulated refrigerator floor comprising, a moisture absorptive heat insulating blanket underlying said floor, and means protecting said blanket from sensible moisture condensed adjacent the under surface of the floor comprising a water vapor permeable sensible moisture impermeable heat insulating unit interposed between the floor and the blanket, and means for draining off condensed moisture trapped in said heat insulating unit.

5. An insulated refrigerator floor comprising, a moisture absorptive heat insulating blanket underlying said floor, means protecting said blanket from sensible moisture condensed adjacent the under surface of the floor comprising a water vapor permeable sensible moisture impermeable heat insulating unit of multi-ply air spaced corrugated cellulose acetate foil interposed between the floor and the blanket, and means including the corrugation troughs of said insulating unit for draining off moisture trapped in said foils.

6. A refrigerator comprising, an inner floor member which is cold during operation of said refrigerator, an outer subfloor which may be penetrated by water vapor, a water vapor permeable, moisture absorptive, heat insulating blanket positioned between said floor and said subfloor, a water vapor permeable, sensible moisture impermeable, heat insulating unit interposed between said floor and said blanket, said unit having sensible moisture trapping means whereby sensible moisture formed from water vapor which penetrates the subfloor, blanket and unit and condenses adjacent said floor is trapped by said unit which thereby protects said blanket.

7. A refrigerator as claimed in claim 6, wherein said unit comprises multiple plies of corrugated plastic foil, the corrugation troughs forming condensed moisture drainage elements.

8. A refrigerator as claimed in claim 6 including, means for draining off condensed moisture trapped in said unit.

References Cited in the file of this patent

UNITED STATES PATENTS

| | | |
|---|---|---|
| 2,142,797 | Murphy | Jan. 3, 1939 |
| 2,264,961 | Ward | Dec. 2, 1941 |
| 2,287,400 | Wells | June 23, 1942 |
| 2,326,717 | Zeidler | Aug. 10, 1943 |
| 2,330,941 | Acuff | Oct. 5, 1943 |
| 2,338,452 | Munters et al. | Jan. 4, 1944 |
| 2,406,815 | Elfving | Sept. 3, 1946 |
| 2,427,937 | Willson | Sept. 23, 1947 |
| 2,548,576 | Willson | Apr. 10, 1951 |

OTHER REFERENCES

Condensation in Walls and Attics, by L. V. Teesdale.
Remedial Measures for Building Condensation Difficulties, Report No. R 1710, September 1947, Table 3.